US012755294B2

(12) United States Patent
Wasserkrug et al.

(10) Patent No.: US 12,755,294 B2
(45) Date of Patent: Oct. 6, 2026

(54) ESTABLISHING A MULTI-CLOUD ENVIRONMENT

(71) Applicant: International Business Machines Corporation, Armonk, NY (US)

(72) Inventors: Eliezer Segev Wasserkrug, Haifa (IL); Takayuki Osogami, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 18/374,409

(22) Filed: Sep. 28, 2023

(65) Prior Publication Data

US 2025/0111427 A1 Apr. 3, 2025

(51) Int. Cl.
*G06Q 30/02* (2023.01)
*G06Q 30/0201* (2023.01)

(52) U.S. Cl.
CPC ..... *G06Q 30/0201* (2013.01); *G06Q 30/0206* (2013.01)

(58) Field of Classification Search
CPC .......................................... G06Q 10/00–90/00
See application file for complete search history.

(56) References Cited

U.S. PATENT DOCUMENTS 9,015,324 B2 4/2015 Jackson
9,824,390 B2 11/2017 Adapalli et al.
12,028,274 B1 * 7/2024 Krishnaiah ............. H04L 12/14
2011/0313902 A1 * 12/2011 Liu ........................ G06Q 30/04 705/34
2014/0280966 A1 9/2014 Sapuram et al.
2015/0206207 A1 * 7/2015 Narasimhan ........ H04L 67/1004 705/400
2024/0289712 A1 * 8/2024 Krishnaiah ...... G06Q 10/06315

OTHER PUBLICATIONS

Jrad et al., "A Broker-based Framework for Multi-Cloud Workflows," Proceedings of the 2013 International Workshop on Multi-Cloud Applications and Federated Clouds, Apr. 22, 2013, pp. 61-68.

(Continued)

*Primary Examiner* — Arif Ullah
(74) *Attorney, Agent, or Firm* — Anthony Curro

(57) ABSTRACT

Described are techniques for establishing a multi-cloud environment. A multi-cloud environment is modeled using a game theoretic model. Furthermore, a probability distribution over information technology costs for both the cloud buyers and cloud providers is created. Additionally, an estimate of the expected utility (measure of how much benefit a party receives or is expected to receive) for each party in a single-cloud environment is calculated. A mechanism (centralized broker) for the multi-cloud environment is then created that collects payments from the cloud buyers and makes payments to the cloud providers using the expected utility for each party in the single-cloud environment and the probability distribution over information technology costs for both the cloud buyers and the cloud providers as parameters for the game theoretic model, such as by applying an automated mechanism design approach to the game theoretic model.

20 Claims, 4 Drawing Sheets

(56) References Cited

OTHER PUBLICATIONS

Juan-Verdejo et al., "XaaS Multi-Cloud Marketplace Architecture Enacting the Industry 4.0 Concepts," 7th Doctoral Conference on Computing, Electrical and Industrial Systems, Apr. 2016, pp. 11-23.
Zhao et al., "Optmial Resource Rental Planning for Elastic Applications in Cloud Market," IEEE 26th International Parallel and Distributed Processing Symposium, Aug. 16, 2012, pp. 808-819.
Truong-Huu et al., "A Game-Theoretic Model for Dynamic Pricing and Competition Among Cloud Providers," ACM 6th International Conference on Utility and Cloud Computing, Dec. 9, 2013, pp. 1-8.
Hatfield et al., "Stability and Competitive Equilibrium in Trading Networks," Journal of Political Economy, vol. 121, No. 5, 2013, pp. 966-1005.
Babaioff et al., "Truthful Online Scheduling of Cloud Workloads Under Uncertainty," Proceedings of the ACM Web Conference, Apr. 2022, pp. 151-161.
Osogami et al., "Mechanism Learning for Trading Networks," arXiv:2208.09222v1, Aug. 19, 2022, pp. 1-19.

* cited by examiner

ESTABLISHING A MULTI-CLOUD ENVIRONMENT

TECHNICAL FIELD

The present disclosure relates generally to a multi-cloud environment, and more particularly to establishing a multi-cloud environment using a mechanism (centralized broker) that ensures that the multi-cloud environment is beneficial to relevant parties (e.g., cloud providers, cloud buyers).

BACKGROUND

Multi-cloud is an infrastructure approach that includes a combination of two or more cloud platforms. These platforms may be public or private, although most multi-cloud environments are comprised of at least two different public cloud platforms. Multi-cloud can also (but not necessarily) include on-premise compute, networking, and storage that integrate and work together with the cloud services.

SUMMARY

In one embodiment of the present disclosure, a computer-implemented method for establishing a multi-cloud environment comprises modeling the multi-cloud environment using a game theoretic model. The method further comprises creating a probability distribution over information technology costs for cloud buyers and cloud providers. The method additionally comprises calculating an estimate of an expected utility for each party in a single-cloud environment. Furthermore, the method comprises creating a mechanism for the multi-cloud environment that collects payments from the cloud buyers and makes payments to the cloud providers using the estimated expected utility for each party in the single-cloud environment and the probability distribution over information technology costs for the cloud buyers and the cloud providers as parameters to the game theoretic model.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
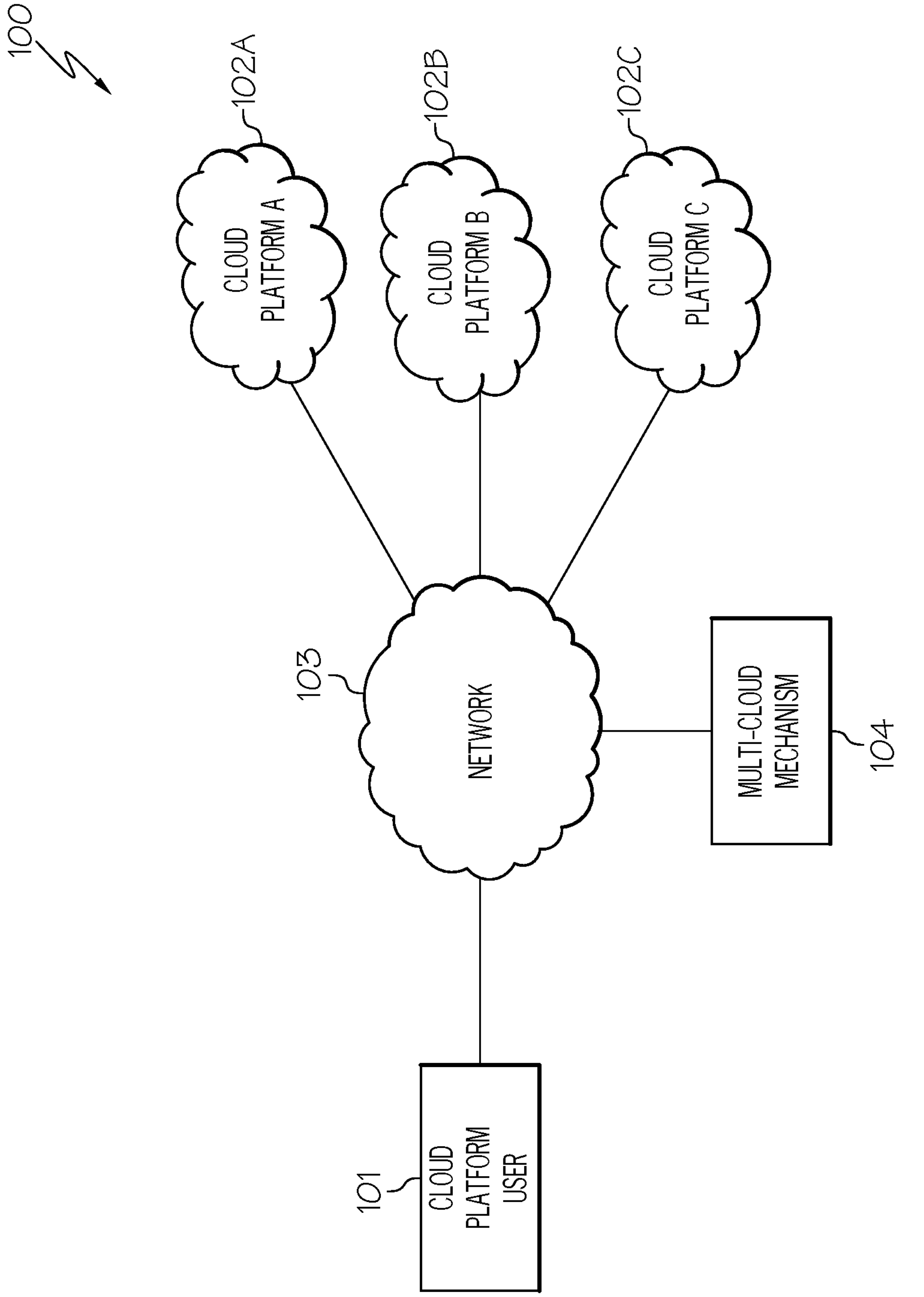
FIG. 1 illustrates an embodiment of the present disclosure of a multi-cloud system for practicing the principles of the present disclosure.

As stated above, multi-cloud is an infrastructure approach that includes a combination of two or more cloud platforms. These platforms may be public or private, although most multi-cloud environments are comprised of at least two different public cloud platforms. Multi-cloud can also (but not necessarily) include on-premise compute, networking, and storage that integrate and work together with the cloud services.

Many organizations desire a multi-cloud approach to infrastructure because it addresses and helps eliminate some common challenges.

For example, having more than one cloud platform allows organizations to take advantage of the unique features and capabilities of each cloud platform. For instance, one cloud platform might be optimized for application hosting while another cloud platform offers cost-effective, scalable space to store public archives, and so forth.

With a multi-cloud approach, organizations overcome the limitations of vendor lock-in and can access all the different capabilities they need. Using a single-cloud approach, the cloud provider locks the cloud users to not only the features and capabilities of the cloud provider but also pricing and other factors, such as available services and tools.

Another reason enterprises opt for multi-cloud is to comply with data sovereignty and regulations in specific geographic locations. Different regions and countries have different laws, so an organization might need to store customer data from one country, for example, on a cloud platform located there, while other customer data from another region is stored separately.

Multi-cloud can also serve as an effective failover model which can help organizations retain data and keep operations running in the event of a cloud or connection failure. Having multiple copies and backups of critical data on different cloud platforms can mean faster recovery time and better business continuity if their main cloud platform goes down.

Unfortunately, establishing a multi-cloud environment may result in direct economic losses to not only the cloud providers (provides on-demand, scalable computing resources, such as computing power, data storage, or applications over the Internet) but also to at least some of the cloud buyers (purchaser of computing resources provided by the cloud providers). For example, the cloud providers' prices in a multi-cloud environment may cause the cloud buyers to lose money as compared to the prices paid in the single-cloud environment (cloud buyer relies upon one cloud provider to provide computing resources).

As a result, currently, a multi-cloud environment does not necessarily benefit the relevant parties (e.g., cloud providers, cloud buyers), including cloud buyers, thereby lessening the incentive to establish a multi-cloud environment.

Furthermore, for existing methods to establish a multi-cloud environment that benefits relevant parties, information, including confidential information, such as information technology costs and the value of the information technology for the cloud buyers and cloud providers, needs to be obtained. Unfortunately, there is little incentive for the parties to disclose such confidential information.

Consequently, there are motivations preventing the establishment of a multi-cloud environment.

The embodiments of the present disclosure provide a means for establishing a multi-cloud environment that is beneficial to the relevant parties (e.g., cloud providers, cloud buyers) and inherently includes the incentives for the relevant parties to divulge their confidential information, such as by establishing that the optimal strategy for the relevant parties is truthful participation. In one embodiment, a multi-cloud environment is modeled using a game theoretic model, such as trading networks. A game theoretic model, as used herein, refers to models that use game theory to predict the actions of either cooperative or competitive individuals (or firms). Furthermore, a probability distribution over information technology costs for both cloud buyers and cloud providers is created. A cloud provider, as used herein, provides on-demand, scalable computing resources, such as computing power, data storage, or applications over the Internet. A cloud buyer, as used herein, refers to a purchaser of computing resources provided by cloud providers. Additionally, an estimate of the expected utility (measure of how much benefit a party receives or is expected to receive) for each party in a single-cloud environment is calculated. Such information (the estimated expected utility and probability distribution over information technology costs) may then be utilized as parameters to the game theoretic model to create a mechanism (centralized broker) using an automated mechanism design. Such a mechanism collects payments from cloud buyers and makes payments to cloud providers while satisfying the following requirements: ensures optimal behavior for the parties to reveal their true costs (truthful participation), maximizes the sum of the utilities for the parties, ensures that the parties obtain on average a higher utility in the multi-cloud environment than in the single-cloud environment, and ensures that the mechanism does not lose money on average from participating in the multi-cloud environment. In this manner, a multi-cloud environment is established that is beneficial to the relevant parties while also incentivizing the parties to divulge their confidential information, such as by establishing that the optimal strategy for the relevant parties is truthful participation. A further discussion regarding these and other features is provided below.

While the following discusses the present disclosure in connection with establishing a multi-cloud environment using a mechanism that ensures that the multi-cloud environment is beneficial to parties, such as cloud providers and cloud buyers, the principles of the present disclosure may ensure that the multi-cloud environment is beneficial to other parties, such as intermediaries, such as service providers that provide higher level services (e.g., software as a service) to cloud buyers and purchase the required infrastructure from cloud infrastructure providers. A person of ordinary skill in the art would be capable of applying the principles of the present disclosure to such implementations by adding the value function for these additional parties, such that this value function contains any direct cost for providing the service which is not paid to the other parties in the multi-cloud environment. Furthermore, embodiments applying the principles of the present disclosure to such implementations would fall within the scope of the present disclosure.

In some embodiments of the present disclosure, the present disclosure comprises a computer-implemented method, system, and computer program product for establishing a multi-cloud environment that is beneficial to the relevant parties. In one embodiment of the present disclosure, a multi-cloud environment is modeled using a game theoretic model. A game theoretic model, as used herein, refers to models that use game theory to predict the actions of either cooperative or competitive individuals (or firms). An example of such a game theoretic model corresponds to trading networks. A trading network, as used herein, refers to a business-to-business network linking buyers, sellers, suppliers, strategic partners, etc. in a marketplace. Furthermore, a probability distribution over information technology costs for both the cloud buyers and cloud providers is created. In one embodiment, the probability distribution over information technology costs for both the cloud buyers and cloud provider is created using information about the single-cloud environment. Additionally, an estimate of the expected utility (measure of how much benefit a party receives or is expected to receive) for each party in a single-cloud environment is calculated. In one embodiment, the estimate of the expected utility for each party in the single-cloud environment is calculated using information about the single-cloud environment, such as current prices, costs, cost discounts, negotiation practices, contracts, etc. Furthermore, a mechanism (centralized broker) for the multi-cloud environment is created that collects payments from the cloud buyers and makes payments to the cloud providers based on the game theoretic model receiving inputs of the expected utility for each party in the single-cloud environment and the probability distribution over information technology costs for both the cloud buyers and the cloud providers. In one embodiment, such a mechanism is configured to establish a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation. In one embodiment, such a mechanism is created by applying an automated mechanism design approach to the game theoretic model while satisfying the following requirements: ensuring optimal behavior for the parties to reveal their true costs (truthful participation), maximizing the sum of the utilities for the parties, ensuring that the parties obtain on average a higher utility in the multi-cloud environment than in the single-cloud environment, and ensuring that the mechanism does not lose money on average from participating in the multi-cloud environment. In this manner, the motivations preventing the establishment of a multi-cloud environment are addressed by establishing a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a multi-cloud system 100 for practicing the principles of the present disclosure. Multi-cloud system 100 includes a cloud platform user 101 connected to two or more cloud platforms 102A-102C (identified as "Cloud Platform A," "Cloud Platform B," and "Cloud Platform C," respectively, in FIG. 1) via a network 103. Cloud platforms 102A-102C may collectively or individually be referred to as cloud platforms 102 or cloud platform 102, respectively.

A cloud platform user 101, as used herein, refers to a user ("cloud buyer") accessing computing resources from cloud platforms 102. While FIG. 1 depicts a single cloud platform user 101, multi-cloud system 100 may include any number of cloud platform users 101.

A cloud platform 102, as used herein, refers to the operating system and hardware of a server in an Internet-based data center. It allows software and hardware products to co-exist remotely and at scale.

In one embodiment, cloud platforms 102 may correspond to various types, such as public cloud platforms, private cloud platforms or hybrid cloud platforms. Public cloud platforms are third-party providers that deliver computing resources over the Internet. Examples include Amazon Web Services® (AWS®), Google Cloud® Platform, Alibaba®, Microsoft® Azure®, and IBM Bluemix®. A private cloud platform is exclusive to a single organization. Typically, a private cloud platform resides in an on-site data center or hosted by a third-party service provider. A hybrid cloud platform is a combination of public and private cloud platforms. Data and applications move seamlessly between the two.

In one embodiment, cloud platform 102 allows organizations to create cloud-native applications, test and build applications, and store, back up, and recover data. It also allows organizations to analyze data. Organizations can also stream video and audio, embed intelligence into their operations, and deliver software on-demand on a global scale.

In one embodiment, in a multi-cloud environment, cloud platform users 101 may access computing resources from two or more cloud platforms 102 at the same time. For example, cloud platform user 101 may access cloud platform 102A to use AWS® for data storage, access cloud platform 102B to use the Google Cloud® Platform for development and testing and access cloud platform 102C to use Microsoft® Azure® for disaster recovery.

Furthermore, as discussed above, cloud platform user 101 is connected to cloud platforms 102 via a network 103. Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

Additionally, as shown in FIG. 1, multi-cloud system 100 includes a multi-cloud mechanism 104 connected to network 103. In one embodiment, multi-cloud mechanism 104 is configured to establish a multi-cloud environment (also referred to as a multi-cloud market) that is beneficial to the relevant parties (e.g., cloud providers, cloud buyers) by inherently including the incentives for the relevant parties to divulge their confidential information, such as by establishing that the optimal strategy for the relevant parties is truthful participation. A "multi-cloud environment," as used herein, refers to the setting where cloud providers provide on-demand, scalable computing resources, such as computing power, data storage, or applications over the Internet, and where cloud buyers purchase computing resources provided by the cloud providers. A discussion regarding multi-cloud mechanism 104 establishing such a multi-cloud environment is provided further below in connection with FIGS. 2 and 4.

Furthermore, a description of the software components of multi-cloud mechanism 104 used for establishing a multi-cloud environment that is beneficial to the relevant parties is provided below in connection with FIG. 2. A description of the hardware configuration of multi-cloud mechanism 104 is provided further below in connection with FIG. 3.

System 100 is not to be limited in scope to any one particular network architecture. System 100 may include any number of cloud platform users 101, cloud platforms 102, networks 103, and multi-cloud mechanisms 104.

A discussion regarding the software components used by multi-cloud mechanism 104 to establish a multi-cloud environment that is beneficial to the relevant parties (e.g., cloud providers, cloud buyers) is provided below in connection with FIG. 2.

Figure 2:
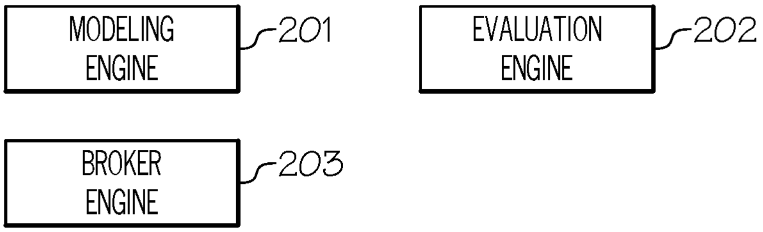
FIG. 2 is a diagram of the software components used by the multi-cloud mechanism to establish a multi-cloud environment that is beneficial to the relevant parties in accordance with an embodiment of the present disclosure.

FIG. 2 is a diagram of the software components used by multi-cloud mechanism 104 to establish a multi-cloud environment that is beneficial to the relevant parties (e.g., cloud providers, cloud buyers) in accordance with an embodiment of the present disclosure.

Referring to FIG. 2, in conjunction with FIG. 1, multi-cloud mechanism 104 includes a modeling engine 201 configured to model a multi-cloud environment using a game theoretic model. A game theoretic model, as used herein, refers to models that use game theory to predict the actions of either cooperative or competitive individuals (or firms). An example of such a game theoretic model corresponds to trading networks. A trading network, as used herein, refers to a business-to-business network linking buyers, sellers, suppliers, strategic partners, etc. in a marketplace.

In one embodiment, modeling engine 201 models the multi-cloud environment by defining a multi-cloud environment to consist of a set of cloud buyers (also referred to herein as simply "buyers") (e.g., cloud platform users 101), which is denoted by CB, such that each cloud buyer $cb \in CB$ has a set of computational workflows they need to run, such that each workflow of buyer cb is composed of a set of tasks $T_{cb}$. An example of such a workflow is a machine learning workflow, which could be composed of a data extraction task and a machine learning task. Each such task requires a set of resources.

Furthermore, multi-client mechanism 104 includes an evaluation engine 202 configured to calculate an estimate of the expected utility (measure of how much benefit a party receives or is expected to receive) for each party in a single-cloud environment. In one embodiment, the estimate of the expected utility for each party in the single-cloud environment is calculated using information about the single-cloud environment, where such information includes current prices, costs, cost discounts, negotiation practices, contracts, etc.

In a cloud environment, there is also a set of cloud providers (also referred to herein as "sellers") (e.g., cloud providers 102), which is denoted by CP. Each cloud provider $cp \in CP$ has a set of computational resources it can provide to cloud buyers to fulfill each of its tasks. For all cloud buyers $cb \in CB$, it is assumed that each of the cloud buyer's tasks can be implemented either on computational resources provided by one of the cloud providers $cp \in CP$, or on internal computational infrastructure owned and operated by the cloud buyer. Cloud buyers pay the cloud providers for computational resources they use and have costs associated with the internal computational resources. Therefore, their utility (measure of how much benefit a party receives or is expected to receive) is the negative of the total costs composed of payments to cloud providers (e.g., cloud providers 102) and usage of internal computational resources. As cloud providers have costs for providing the computational resources to the cloud buyers, each cloud provider's cp utility is the sum of the payments cp received from the cloud buyers minus the cost of providing the resources. In one embodiment, the cost of a cloud buyer cb for providing the computational resources for a subset of tasks $T' \subseteq T_{cb}$ is modeled by a function $F_{cb}: 2^{Tcb} \rightarrow R^+$, and the cost of cloud provider $cp \in CP$ for providing the set of computational resources for a subset of tasks $T' \subseteq T = \cup_{cb} \in CBT_{cb}$ by a function $c_{cp}: 2^T \rightarrow R^+$.

In one embodiment, a trading network is a tuple TR=(N, Ω, V) where N is a set of players (or firms), Ω is a set of bi-lateral trades such that each $\omega \in \Omega$ has a buyer b(ω) and a seller s(ω), and $V=\{v_i: i \in N\}$, where each $v_i:2^\omega \rightarrow$ is the valuation function of player I, mapping any set of trades to a real value.

In a solution of a trading network, the set of trades ω defines a set of prices $$p_b^s$$

from cloud buyer b to cloud provider/seller s. The utility of a set of trades for $i \in N$ is defined by $$u_i(\Psi) = v_i(\Psi_i) + \sum_{b \in b(\Psi_i) \setminus i} p_i^b - \sum_{s \in s(\Psi_i) \setminus i} p_s^i \quad (1)$$

where $\Psi_i$ is the set of trades in which i is either a cloud buyer or a cloud provider/seller, $s(\Psi_i)$ are the set of sellers in the trades $\Psi_i$ and $b(\Psi_i)$ are the set of buyers in $\Psi_i$.

The multi-cloud may then be modeled as a two sided trading network TR={N, Ω, V} where the agents are the set $N=CP \cup CB$ where $\forall \omega \in \omega$, $s(\omega) \in CP$ and $b(\omega) \in CB$. In one embodiment, the set of possible trades is $$\Omega \equiv \{(cp, cb, T'_{cb}): cp \in CP, cb \in CB, T'_{cb} \subseteq T_{cb}\},$$

i.e., there is a possible trade for each combination of cloud provider, cloud buyer, and subset of tasks for that specific cloud buyer.

Virtually, $V=V_{cp} \cup V_{cb}$ where $\forall \Psi \subseteq \Omega$. In one embodiment, $v_{cp} \in V_{cp}$ is such that $$v_{cp}(\Psi) = -c_{cp}(T_{cp}^\Psi)$$

where $T_{cp}$ are the set of trades in Ψ for which cp is a seller, i.e., $$\bigcup_{(cp,cb,t_{cb}) \in \Psi} t_{cb},$$

i.e., cp's cost for providing the resources required by all tasks it committed to. It is noted that it is assumed that if cp cannot provide the resources required for a task $$t_{cb} \in T_{cp}^\Psi,$$

then $$c_{cp}(T_{cp}^\Psi) = \infty.$$

Furthermore, $$v_{cb}(\Psi) = -F_{cb}(T_{cb} \setminus T_{cb}^\Psi)$$

where $$T_{cb}^\Psi = \bigcup_{(cp,cb,T'_{cb}) \in \Psi} T'_{cb}.$$

This is the cost for buyer cb of implementing internally the tasks that are not fulfilled by trades in Ψ.

Given the above definition, and as each party in the multi-cloud environment is either a buyer or a seller, the utility of each party in the multi-cloud network is defined, according to Equation 1 as: (1) for each cloud buyer cb, $$u_{cb}(\Psi) = v_{cb}(\Psi_{cb}) - \sum_{s \in s(\Psi_{cb}) \setminus cb} p_s^{cb}$$

and (2) for each cloud provider cp, $$u_{cp}(\Psi) = v_{cp}(\Psi_{cp}) - \sum_{b \in b(\Psi_{cp}) \setminus cp} p_{cp}^b,$$

where Ψ is the set of agreed trades between the cloud buyers and the cloud providers in the environment.

In one embodiment, there is a centralized broker, such that all payments are sent via the centralized broker. Therefore, in such a setting, the utilities are the following: (1) for each cloud buyer cb, $u_{cb}(\Psi, p_{cb}) = v_{cb}(\Psi_{cb}) - p_{cb}$, where $p_{cb}$ is the total price paid to the broker by cb for the set of trades Ψ; and (2) for each cloud provider cp, $u_{cp}(\Psi, p_{cp}) = v_{cp}(\Psi_{cp}) + p_{cp}$, where $p_{cp}$ is the total price paid to cp by the broker for the set of trades Ψ.

It is noted that the above formulation is general, and can incorporate factors, such as volume discounts provided by the cloud providers, captured in the single price a cloud buyer pays to a cloud provider, and the cost, such as networking costs, captured in the v functions of the cloud buyers.

Furthermore, in one embodiment, evaluation engine 202 is configured to create a probability distribution over information technology costs for both the cloud buyers and the cloud providers. In one embodiment, the probability distribution over information technology costs for both the cloud buyers and the cloud provider is created using information about the single-cloud environment, where such information includes current prices, costs, cost discounts, negotiation practices, contracts, etc.

In one embodiment, a mechanism (referred to herein as the "centralized broker") is created using such parameters as discussed further below, where such a mechanism for the multi-cloud environment collects payments from the cloud buyers (e.g., cloud platform users 101) and makes payments to the cloud providers (e.g., cloud providers 102) and establishes a multi-cloud environment that is beneficial to the relevant parties while also incentivizing the parties to divulge their confidential information, such as by establishing that the optimal strategy for the relevant parties is truthful participation, as discussed further below. In one embodiment, all payments flow through such a mechanism (centralized broker). For example, the mechanism instructs each cloud buyer (e.g., cloud platform user 101) how much they need to pay. The cloud buyers then pay the mechanism, which distributes the payments among cloud providers 102.

In one embodiment, in order to establish a multi-cloud environment that is beneficial to the relevant parties, such a centralized broker needs to know both the set of cloud buyers and cloud providers $CB \cup CP$ and the possible set of trades $\Omega$.

As the cloud buyers and cloud providers interact with the centralized broker, it is assumed that the set of cloud buyers (e.g., cloud platform users 101) and cloud providers (e.g., cloud providers 102) are known to the centralized broker. Similarly, as the cloud buyers need to get their resource requirements through the centralized broker, it is assumed that they provide the set of tasks for which they need computational resources, corresponding to $\Omega$.

However, as the costs and prices of the respective parties, i.e., the functions $F_{cb}$ and $c_{cp}$ for $cb \in CB$ and $cp \in CP$ are confidential information, it is assumed that there is a probability distribution over the costs and values. In one embodiment, the following is assumed: (1) $\forall cb \in CB$, there is a finite set $v_{cb}$ of functions such that each function $F_{cb} \in V_{cb}$ is a possible cost function for cb; (2) $\forall cp \in CP$, there is a finite set $V_{cp}$ of functions such that each function $c_{cp} \in V_{cp}$ is a possible cost function for cp, and (3) there is probability distribution $P_v$ over the set of possible functions $V \equiv \cup_{cb \in CB} V_{cb} \cup \cup_{cp \in CP} V_{cp}$.

It is noted that this defines a probability distribution over the trading network, where each network differs from the others by the set of value functions.

In one embodiment, such a distribution is estimated based on publicly available relevant information, including, but not limited to, hardware prices (e.g., prices for CPUs, GPUs, memory, hard disk, etc.), prices publicized by cloud providers (e.g., cloud providers 102), manpower costs and skills for hosting an onsite computing infrastructure by the cloud buyers (e.g., cloud platform users 101), and knowledge about the types of tasks being run by various cloud buyers.

In one embodiment, such information provides a range both on the possible costs of cloud providers (e.g., cloud providers 102) as well as the costs incurred by the cloud buyers (e.g., cloud platform users 101) when providing IT infrastructure internally. In one embodiment, such a range is discretized to obtain a discrete set of possible $V_{cb}$ and $V_{cp}$ functions, and then define, again, based on publicly available information, a distribution $P_V$ on these values, assigning relative likelihood to each possible value.

In one embodiment, evaluation engine 202 creates such a probability distribution by creating a histogram of possible prices based on the publicly available information, and then using the empirical distribution of the cost functions as the probability distribution.

Additionally, multi-cloud mechanism 104 includes a broker engine 203 configured to create a mechanism (centralized broker) for a multi-cloud environment that collects payments from the cloud buyers (e.g., cloud platform users 101) and makes payments to the cloud providers (e.g., cloud providers 102) using the expected utility for each party in the single-cloud environment and the probability distribution over information technology costs for both the cloud buyers and the cloud providers as parameters to the game theoretic model. In one embodiment, such a mechanism is configured to establish a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation. In one embodiment, such a multi-cloud environment is established by creating such a mechanism by applying an automated mechanism design approach to the game theoretic model. In one embodiment, as discussed further below, the automated mechanism design approach solves an optimization problem to create the mechanism (centralized broker) for the multi-cloud environment that collects payments from the cloud buyers (e.g., cloud platform users 101) and makes payments to the cloud providers (e.g., cloud providers 102).

In one embodiment, the mechanism (centralized broker) collects payments from cloud buyers (e.g., cloud platform users 101) and makes payments to cloud providers (e.g., cloud providers 102) while satisfying the following requirements: ensuring optimal behavior for the parties to reveal their true costs (truthful participation), maximizing the sum of the utilities for the parties, ensuring that the parties obtain on average a higher utility in the multi-cloud environment than in the single-cloud environment, and ensuring that the mechanism does not lose money on average from participating in the multi-cloud environment. In this manner, a multi-cloud environment is established that is beneficial to the relevant parties while also incentivizing the parties to divulge their confidential information, such as by establishing that the optimal strategy for the relevant parties is truthful participation.

Automated Mechanism Design (AMD) is a technique by which distribution specific mechanisms are learnt that fulfill desired properties. In one embodiment, the AMD approach is applied for trading networks to find a multi-cloud brokerage mechanism that fulfills the following: it is dominant strategy incentive compatible (DSIC), i.e., truthful participation is an optimal policy for all players, formally expressed as:

$$\forall\, i \in N,\ v_i^{multi}(\Psi) + \tau_i\left(v_i^{multi}, v_{-i}\right) \geq v_i(\Psi) + \tau_i(v_i, v_{-i}),\ \forall\, v_{-i}, v_i \tag{2}$$

where $T_i(v_i, v_{-i})$ is the payment by I to the mechanism (centralized broker) when I declares the valuation $v_i$ and the rest of the players (e.g., cloud platform users 101) collectively declare the valuation $v_{-i}$ to the mechanism, and $$v_i^{multi}$$

is the true valuation of player i in the multi-cloud setting.

Furthermore, the AMD approach is applied for trading networks to find a multi-cloud brokerage mechanism that fulfills the following: it is efficient, i.e., it maximizes the sum of the value obtained by the cloud buyers (e.g., cloud platform users 101) and cloud providers (e.g., cloud providers 102) as illustrated in the following equation:

$$\sum_{i \in N} v_i^{multi}(\Psi^*) \geq \sum_{i \in N} v_i(\Psi), \forall \Psi \subseteq \Omega \tag{3}$$

Additionally, the AMD approach is applied for trading networks to find a multi-cloud brokerage mechanism that fulfills the following: the mechanism (centralized broker) only earns money from participating i.e., the expected payments to the broker is non-negative, as illustrated in the following equation:

$$E_{P_{\mathcal{V}}}\left[\sum_{i \in N} \tau_i(v)\right] \geq 0 \tag{4}$$

Furthermore, the AMD approach is applied for trading networks to find a multi-cloud brokerage mechanism that fulfills the following: all parties can earn at least $\in$ more than in the single-cloud setting as illustrated in the following equation:

$$\forall i \in \mathcal{N}, v_i \in \mathcal{V}, E_{(P_{\mathcal{V}}|v_i)}(v_i(\Psi) + \tau_i(v_i, v_{-i})) \geq \sigma_i^{v_i} + \epsilon \tag{5}$$

where $$\sigma_i^{vi}$$

is the utility of player i with type (valuation function) $v_i$ in the single-cloud setting and $P_V|v_i$ is the probability distribution $P_V$ conditioned on the value of player i being $v_i$.

In one embodiment, to find such a mechanism, the above set of constraints are formulated as the following optimization problem:

$$\min_h \sum_i P_{\mathcal{V}}[h_i(v_{-i})] \tag{6}$$

$$\text{s.t. } \sum_i P_{\mathcal{V}}[h_i(v_{-i})] \geq -(m-1)\sum_{i,j} P_{\mathcal{V}}\left[c_{i,j}^{v_i} q^\star(i, j \mid v)\right] \tag{7}$$

$$P_{\mathcal{V}}[h_i(v_{-i})] \leq \sigma_i^{v_i} + \epsilon - \sum_{i',j} P_{\mathcal{V}} \mid v_i\left[c_{i',j}^{(v_{i'})} q^\star(i', j \mid v)\right], \forall i, \forall v_i \tag{8}$$

In one embodiment, the utility of a party in a single-cloud setting is calculated as follows. It is assumed that the mechanism (centralized broker) has knowledge of a mechanism $M^{single}$ which given a set of value functions, determines the value of a party in a particular trading network with a specific set of values. In such a case, equation (5) above is changed to:

$$\forall i \in \mathcal{N}, v_i \in \mathcal{V}, \mathbb{E}_{|v_i}[v_i(\Psi^*(v)) + p_i(v)] \geq \mathbb{E}_{|v_i}\left[u_i^{M^{single}}(v)\right] + \epsilon$$

in which case the constraint in equation (8) is changed to $$\mathbb{E}[h_i(v_{-i})] \leq \sum_{\substack{j \in N_c \\ \forall i, \forall v_i}} \mathbb{E}_{|v_i}\left[v_j(\Psi^*(v)) - u_i^{M^{single}}(v)\right] + \epsilon, \tag{17}$$

In one embodiment, Equation 6 specifies that the average sum of payments the mechanism (centralized broker) will have to give to the parties is minimized. If it is at most zero, it means that a mechanism with the desired properties can be found for this specific distribution V. If it is negative, the absolute value of this objective is the average amount the centralized broker earns.

Equation 7 ensures that it is the optimal course of action for each player to truthfully reveal their costs and values to the centralized broker.

Equation 8 (resp. 17) ensures that on average, each participant gets at least $$\sigma_i^{vi} + \in,$$

where $$\sigma_i^{vi}$$

is the utility of player i with type $v_i$ in the single-cloud setting.

In one embodiment, following the AMD approach discussed above and the utilization of the optimization problem formulation, an appropriate mechanism can also be derived by using a learning approach rather than explicitly solving the above optimization problem. The benefits of such a learning approach are that (1) the distribution V does not have to be explicitly specified, as only samples are required, and (2) the optimization problem described above does not have to be explicitly solved.

A further description of these and other features is provided below in connection with the discussion of the method for establishing a multi-cloud environment that is beneficial to the relevant parties.

Prior to the discussion of the method for establishing a multi-cloud environment that is beneficial to the relevant parties, a description of the hardware configuration of multi-cloud mechanism 104 (FIG. 1) is provided below in connection with FIG. 3.

Figure 3:
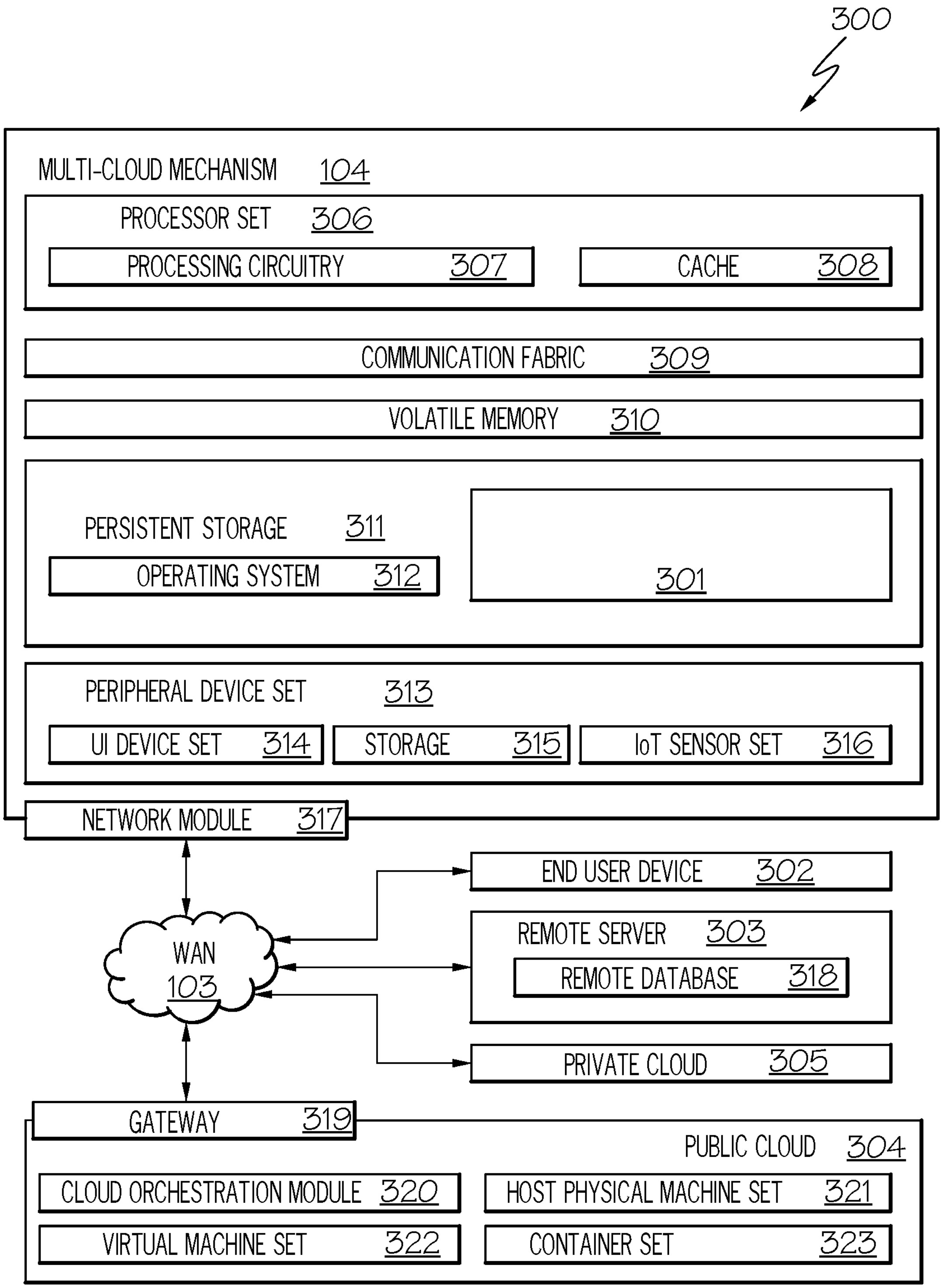
FIG. 3 illustrates an embodiment of the present disclosure of the hardware configuration of the multi-cloud mechanism which is representative of a hardware environment for practicing the present disclosure.

Referring now to FIG. 3, in conjunction with FIG. 1, FIG. 3 illustrates an embodiment of the present disclosure of the hardware configuration of multi-cloud mechanism 104 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code (computer code for establishing a multi-cloud environment that is beneficial to the relevant parties, which is stored in block 301) involved in performing the disclosed methods, such as establishing a multi-cloud environment that is beneficial to the relevant parties. In addition to block 301, computing environment 300 includes, for example, multi-cloud mechanism 104, network 103, such as a wide area network (WAN), end user device (EUD) 302, remote server 303, public cloud 304, and private cloud 305. In this embodiment, multi-cloud mechanism 104 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Multi-cloud mechanism 104 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically multi-cloud mechanism 104, to keep the presentation as simple as possible. Multi-cloud mechanism 104 may be located in a cloud, even though it is not shown in a cloud in FIG. 3. On the other hand, multi-cloud mechanism 104 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto multi-cloud mechanism 104 to cause a series of operational steps to be performed by processor set 306 of multi-cloud mechanism 104 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 308 and the other storage media discussed below. The program instructions, and associated data, are accessed by processor set 306 to control and direct performance of the disclosed methods. In computing environment 300, at least some of the instructions for performing the disclosed methods may be stored in block 301 in persistent storage 311.

Communication fabric 309 is the signal conduction paths that allow the various components of multi-cloud mechanism 104 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In multi-cloud mechanism 104, the volatile memory 310 is located in a single package and is internal to multi-cloud mechanism 104, but, alternatively or additionally, the volatile memory may be distributed over multiple packages and/or located externally with respect to multi-cloud mechanism 104.

Persistent Storage 311 is any form of non-volatile storage for computers that is now known or to be developed in the future. The non-volatility of this storage means that the stored data is maintained regardless of whether power is being supplied to multi-cloud mechanism 104 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the disclosed methods.

Peripheral device set 313 includes the set of peripheral devices of multi-cloud mechanism 104. Data communication connections between the peripheral devices and the other components of multi-cloud mechanism 104 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where multi-cloud mechanism 104 is required to have a large amount of storage (for example, where multi-cloud mechanism 104 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows multi-cloud mechanism 104 to communicate with other computers through WAN 103. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the disclosed methods can typically be downloaded to multi-cloud mechanism 104 from an external computer or external storage device through a network adapter card or network interface included in network module 317.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates multi-cloud mechanism 104), and may take any of the forms discussed above in connection with multi-cloud mechanism 104. EUD 302 typically receives helpful and useful data from the operations of multi-cloud mechanism 104. For example, in a hypothetical case where multi-cloud mechanism 104 is designed to provide a recommendation to an end user, this recommendation would typically be communicated from network module 317 of multi-cloud mechanism 104 through WAN 103 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to multi-cloud mechanism 104. Remote server 303 may be controlled and used by the same entity that operates multi-cloud mechanism 104. Remote server 303 represents the machine(s) that collect and store helpful and useful data for use by other computers, such as multi-cloud mechanism 104. For example, in a hypothetical case where multi-cloud mechanism 104 is designed and programmed to provide a recommendation based on historical data, then this historical data may be provided to multi-cloud mechanism 104 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 2 to establish a multi-cloud environment that is beneficial to the relevant parties. In one embodiment, such components may be implemented in hardware. The functions discussed above performed by such components are not generic computer functions. As a result, multi-cloud mechanism 104 is a particular machine that is the result of implementing specific, non-generic computer functions.

In one embodiment, the functionality of such software components of multi-cloud mechanism 104, including the functionality for establishing a multi-cloud environment that is beneficial to the relevant parties, may be embodied in an application specific integrated circuit.

As stated above, many organizations desire a multi-cloud approach to infrastructure because it addresses and helps eliminate some common challenges. For example, having more than one cloud platform allows organizations to take advantage of the unique features and capabilities of each cloud platform. For instance, one cloud platform might be optimized for application hosting while another cloud platform offers cost-effective, scalable space to store public archives, and so forth. With a multi-cloud approach, organizations overcome the limitations of vendor lock-in and can access all the different capabilities they need. Using a single-cloud approach, the cloud provider locks the cloud users to not only the features and capabilities of the cloud provider but also pricing and other factors, such as available services and tools. Another reason enterprises opt for multi-cloud is to comply with data sovereignty and regulations in specific geographic locations. Different regions and countries have different laws, so an organization might need to store customer data from one country, for example, on a cloud platform located there, while other customer data from another region is stored separately. Multi-cloud can also serve as an effective failover model which can help organizations retain data and keep operations running in the event of a cloud or connection failure. Having multiple copies and backups of critical data on different cloud platforms can mean faster recovery time and better business continuity if their main cloud platform goes down. Unfortunately, establishing a multi-cloud environment may result in direct economic losses to not only the cloud providers (provides on-demand, scalable computing resources, such as computing power, data storage, or applications over the Internet) but also to at least some of the cloud buyers (purchaser of computing resources provided by the cloud providers). For example, the cloud providers' prices in a multi-cloud environment may cause the cloud buyers to lose money as compared to the prices paid in the single-cloud environment (cloud buyer relies upon one cloud provider to provide computing resources). As a result, currently, a multi-cloud environment does not necessarily benefit the relevant parties (e.g., cloud providers, cloud buyers), including cloud buyers, thereby lessening the incentive to establish a multi-cloud environment. Furthermore, for existing methods to establish a multi-cloud environment that benefits the relevant parties, information, including confidential information, such as information technology costs and the value of the information technology for the cloud buyers and cloud providers, needs to be obtained. Unfortunately, there is little incentive for the parties to disclose such confidential information. Consequently, there are motivations preventing the establishment of a multi-cloud environment.

The embodiments of the present disclosure provide a means for establishing a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation, as discussed below in connection with FIG. 4.

Figure 4:
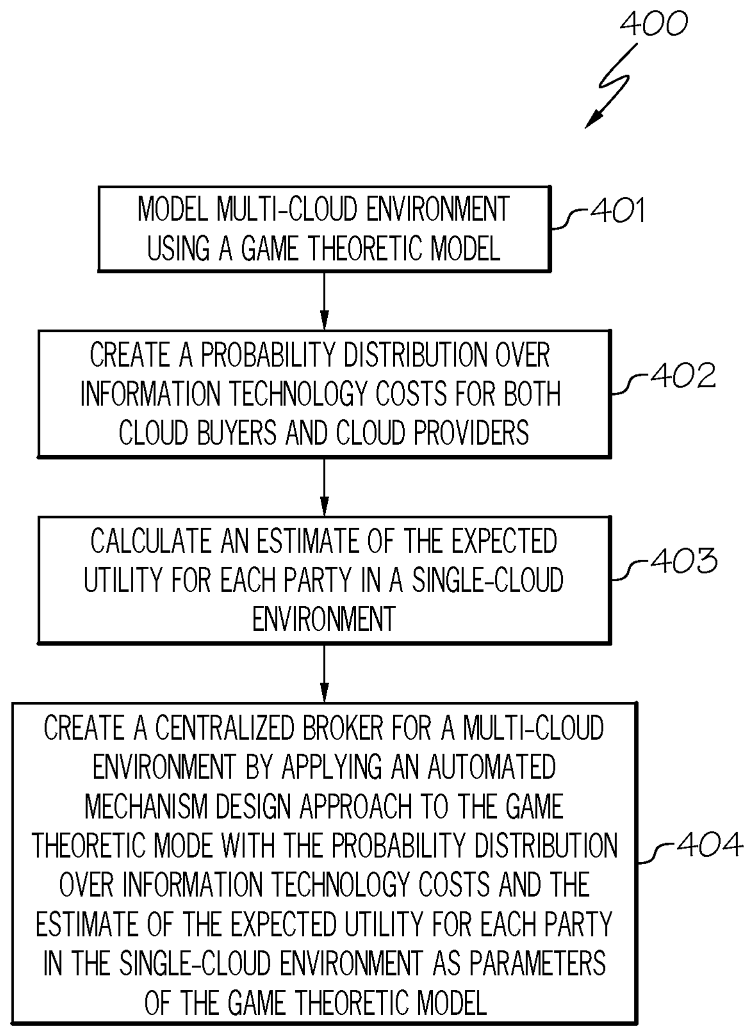
FIG. 4 is a flowchart of a method for establishing a multi-cloud environment that is beneficial to the relevant parties in accordance with an embodiment of the present disclosure.

FIG. 4 is a flowchart of a method 400 for establishing a multi-cloud environment that is beneficial to the relevant parties in accordance with an embodiment of the present disclosure.

Referring to FIG. 4, in conjunction with FIGS. 1-3, in operation 401, modeling engine 201 of multi-cloud mechanism 104 models a multi-cloud environment using a game theoretic model. A game theoretic model, as used herein, refers to models that use game theory to predict the actions of either cooperative or competitive individuals (or firms). An example of such a game theoretic model corresponds to trading networks. A trading network, as used herein, refers to a business-to-business network linking buyers, sellers, suppliers, strategic partners, etc. in a marketplace.

As discussed above, in one embodiment, modeling engine 201 models the multi-cloud environment by defining a multi-cloud environment to consist of a set of cloud buyers (also referred to herein as simply "buyers") (e.g., cloud platform users 101), which is denoted by CB, such that each cloud buyer $cb \in CB$ has a set of computational workflows they need to run, such that each workflow of buyer cb is composed of a set of tasks $T_{cb}$. An example of such a workflow is a machine learning workflow, which could be composed of a data extraction task and a machine learning task. Each such task requires a set of resources.

In operation 402, evaluation engine 202 of multi-cloud mechanism 104 creates a probability distribution over information technology costs for both the cloud buyers and cloud providers.

As discussed above, in one embodiment, the probability distribution over information technology costs for both the cloud buyers and cloud provider is created using information about the single-cloud environment, where such information includes current prices, costs, cost discounts, negotiation practices, contracts, etc.

In one embodiment, a mechanism (referred to herein as the "centralized broker") is created using such parameters, where such a mechanism for the multi-cloud market collects payments from the cloud buyers (e.g., cloud platform users 101) and makes payments to the cloud providers (e.g., cloud providers 102) and establishes a multi-cloud environment that is beneficial to the relevant parties while also incentivizing the parties to divulge their confidential information, such as by establishing that the optimal strategy for the relevant parties is truthful participation.

In one embodiment, in order to establish a multi-cloud environment that is beneficial to the relevant parties, such a centralized broker needs to know both the set of cloud buyers and cloud providers $CB \cup CP$ and the possible set of trades $\Omega$.

As the cloud buyers and cloud providers interact with the centralized broker, it is assumed that the set of cloud buyers (e.g., cloud platform users 101) and cloud providers (e.g., cloud providers 102) are known to the centralized broker. Similarly, as the cloud buyers need to get their resource requirements through the centralized broker, it is assumed that they provide the set of tasks for which they need computational resources, corresponding to $\Omega$.

However, as the costs and prices of the respective parties, i.e., the functions $F_{cb}$ and $c_{cp}$ for $cb \in CB$ and $cp \in CP$ are confidential information, it is assumed that there is a probability distribution over the costs and values. In one embodiment, the following is assumed: (1) $\forall cb \in CB$, there is a finite set $V_{cb}$ of functions such that each function $F_{cb} \in V_{cb}$ is a possible cost function for cb; (2) $\forall cp \in CP$, there is a finite set $V_{cp}$ of functions such that each function $c_{cp} \in V_{cp}$ is a possible cost function for cp; and (3) there is probability distribution P' over the set of possible functions $V \equiv \cup_{cb \in CB} V_{cb} \cup \cup_{cp \in CP} V_{cp}$.

It is noted that this defines a probability distribution over the trading network, where each network differs from the others by the set of value functions.

In one embodiment, such a distribution is estimated based on publicly available relevant information, including, but not limited to, hardware prices (e.g., prices for CPUs, GPUs, memory, hard disk, etc.), prices publicized by cloud providers (e.g., cloud providers 102), manpower costs and skills for hosting an onsite computing infrastructure by the cloud buyers (e.g., cloud platform users 101), and knowledge about the types of tasks being run by various cloud buyers.

In one embodiment, such information provides a range both on the possible costs of cloud providers (e.g., cloud providers 102) as well as the costs incurred by the cloud buyers (e.g., cloud platform users 101) when providing IT infrastructure internally. In one embodiment, such a range is discretized to obtain a discrete set of possible $V_{cb}$ and $V_{cp}$ functions, and then define, again, based on publicly available information, a distribution $P_V$ on these values, assigning relative likelihood to each possible value.

In one embodiment, evaluation engine 202 creates such a probability distribution by creating a histogram of possible prices based on the publicly available information, and then using the empirical distribution of the cost functions as the probability distribution.

In operation 403, evaluation engine 202 of multi-client mechanism 104 calculates an estimate of the expected utility (measure of how much benefit a party receives or is expected to receive) for each party in a single-cloud environment.

As stated above, in one embodiment, the estimate of the expected utility for each party in the single-cloud environment is calculated using information about the single-cloud environment, where such information includes current prices, costs, cost discounts, negotiation practices, contracts, etc.

In a cloud environment, there is also a set of cloud providers (also referred to herein as "sellers") (e.g., cloud providers 102), which is denoted by CP. Each cloud provider $cp \in CP$ has a set of computational resources it can provide to cloud buyers to fulfill each of its tasks. For all cloud buyers $cb \in CB$, it is assumed that each of the cloud buyer's tasks can be implemented either on computational resources provided by one of the cloud providers $cp \in CP$, or on internal computational infrastructure owned and operated by the cloud buyer. Cloud buyers pay the cloud providers for computational resources they use and have costs associated with the internal computational resources. Therefore, their utility (measure of how much benefit a party receives or is expected to receive) is the negative of the total costs composed of payments to cloud providers (e.g., cloud providers 102) and usage of internal computational resources. As cloud providers have costs for providing the computational resources to the cloud buyers, each cloud provider's cp utility is the sum of the payments cp received from the cloud buyers minus the cost of providing the resources. In one embodiment, the cost of a cloud buyer cb for providing the computational resources for a subset of tasks $T' \subseteq T_{cb}$ is modeled by a function $F_{cb}: 2^{Tcb} \rightarrow R^+$, and the cost of cloud provider $cp \in CP$ for providing the set of computational resources for a subset of tasks $T'' \cup T = \cup_{cb \in CB} T_{cb}$ by a function $c_{cp}: 2^T \rightarrow R^+$.

In one embodiment, a trading network is a tuple TR=(N, Ω, V) where N is a set of players (or firms), Ω is a set of bi-lateral trades such that each $\omega \in \Omega$ has a buyer b(ω) and a seller s(ω), and $V = \{v_i : i \in N\}$, where each $v_i: 2^\Omega \rightarrow$ is the valuation function of player I, mapping any set of trades to a real value.

In a solution of a trading network, the set of trades Ω defines a set of prices $$p_b^s$$

from cloud buyer b to cloud provider/seller s. The utility of a set of trades for $i \in N$ is defined by $$u_i(\Psi) = v_i(\Psi_i) + \sum_{b \in b(\Psi_i) \setminus i} p_i^b - \sum_{s \in s(\Psi_i) \setminus i} p_s^i \tag{1}$$

where $\psi_i$ is the set of trades in which i is either a cloud buyer or a cloud provider/seller, $s(\Psi_i)$ are the set of sellers in the trades $\Psi_i$ and $b(\Psi_i)$ are the set of buyers in $\Psi_i$.

The multi-cloud may then be modeled as a two sided trading network TR={N, Ω, V} where the agents are the set $N = CP \cup CB$ where $\forall \omega \in \Omega$, $s(\omega) \in CP$ and $b(\omega) \in CB$. In one embodiment, the set of possible trades is $$\Omega \equiv \{(cp, cb, T'_{cb}) : cp \in CP, cb \in CB, T'_{cb} \subseteq T_{cb}\},$$

i.e., there is a possible trade for each combination of cloud provider, cloud buyer, and subset of tasks for that specific cloud buyer.

Virtually, $V = V_{cp} \cup V_{cb}$ where $\forall \Psi \cup \Omega$. In one embodiment, $v_{cp} \in V_{cp}$ is such that $$v_{cp}(\Psi) = -c_{cp}(T_{cp}^{\Psi})$$

where $T_{cp}$ are the set of trades in Ψ for which cp is a seller, i.e., $\cup(cp, cb, t_{cp}) \in \Psi t_{cp}$, i.e., cp's cost for providing the resources required by all tasks it committed to. It is noted that it is assumed that if cp cannot provide the resources required for a task $$t_{cb} \in T_{cp}^{\Psi},$$

then $$c_{cp}\left(T_{cp}^{\Psi}\right) = \infty.$$

Furthermore, $$v_{cb}(\Psi) = -F_{cb}\left(T_{cb} \setminus T_{cp}^{\Psi}\right)$$

where $$T_{cp}^{\Psi} = \bigcup\nolimits_{(cp,cb,T'_{cb}) \in \Psi} T'_{cb}.$$

This is the cost for buyer cb of implementing internally the tasks that are not fulfilled by trades in Ψ.

Given the above definition, and as each party in the multi-cloud environment is either a buyer or a seller, the utility of each party in the multi-cloud network is defined, according to Equation 1 as: (1) for each cloud buyer cb, $$u_{cb}(\Psi) = v_{cb}(\Psi_{cb}) - \sum\nolimits_{s \in s(\Psi_{cb}) \setminus cb} p_s^{cb}$$

and (2) for each cloud provider cp, $$u_{cb}(\Psi) = v_{cb}(\Psi_{cb}) + \sum\nolimits_{b \in b(\Psi_{np}) \setminus cb} p_{cp}^{b},$$

where Ψ is the set of agreed trades between the cloud buyers and the cloud providers in the environment.

In one embodiment, there is a centralized broker, such that all payments are sent via the centralized broker. Therefore, in such a setting, the utilities are the following: (1) for each cloud buyer cb, $u_{cb}(\Psi, P_{cb}) = v_{cb}(\Psi_{cb}) - p_{cb}$, where $p_{cb}$ is the total price paid to the broker by cb for the set of trades Ψ; and (2) for each cloud provider cp, $u_{cp}(\Psi, p_{cp}) = v_{cp}(\Psi_{cp}) + p_{cp}$, where $p_{cp}$ is the total price paid to cp by the broker for the set of trades Ψ.

It is noted that the above formulation is general, and can incorporate factors, such as volume discounts provided by the cloud providers, captured in the single price a cloud buyer pays to a cloud provider, and the cost, such as networking costs, captured in the v functions of the cloud buyers.

In operation 404, broker engine 203 of multi-cloud mechanism 104 creates a mechanism (centralized broker) for a multi-cloud environment that collects payments from the cloud buyers (e.g., cloud platform users 101) and makes payments to the cloud providers (e.g., cloud providers 102) using the probability distribution over information technology costs for both the cloud buyers and the cloud providers and the expected utility for each party in the single-cloud environment as parameters of the game theoretic model.

As stated above, in one embodiment, such a mechanism is configured to establish a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation. In one embodiment, such a multi-cloud environment is established by creating such a mechanism by applying an automated mechanism design approach to the game theoretic model. In one embodiment, the automated mechanism design approach solves an optimization problem to create the mechanism (centralized broker) for the multi-cloud environment that collects payments from the cloud buyers (e.g., cloud platform users 101) and makes payments to the cloud providers (e.g., cloud providers 102).

In one embodiment, the mechanism (centralized broker) collects payments from cloud buyers (e.g., cloud platform users 101) and makes payments to cloud providers (e.g., cloud providers 102) while satisfying the following requirements: ensuring optimal behavior for the parties to reveal their true costs (truthful participation), maximizing the sum of the utilities for the parties, ensuring that the parties obtain on average a higher utility in the multi-cloud environment than in the single-cloud environment, and ensuring that the mechanism does not lose money on average from participating in the multi-cloud environment. In this manner, a multi-cloud environment is established that is beneficial to the relevant parties while also incentivizing the parties to divulge their confidential information, such as by establishing that the optimal strategy for the relevant parties is truthful participation.

Automated Mechanism Design (AMD) is a technique by which distribution specific mechanisms are learnt that fulfill desired properties. In one embodiment, the AMD approach is applied for trading networks to find a multi-cloud brokerage mechanism that fulfills the following: it is dominant strategy incentive compatible (DSIC), i.e., truthful participation is an optimal policy for all players, formally expressed as:

$$\forall\, i \in N,\ v_i^{multi}(\Psi) + \tau_i\left(v_i^{multi}, v_{-i}\right) \geq v_i(\Psi) + \tau_i(v_i, v_{-i}),\ \forall\, v_{-i}, v_i \tag{2}$$

where $T_i(v_i, v_{-i})$ is the payment by I to the mechanism (centralized broker) when I declares the valuation $v_i$ and the rest of the players (e.g., cloud platform users 101) collectively declare the valuation $v_{-i}$ to the mechanism, and $$v_i^{multi}$$

is the true valuation of player i in the multi-cloud setting.

Furthermore, the AMD approach is applied for trading networks to find a multi-cloud brokerage mechanism that fulfills the following: it is efficient, i.e., it maximizes the sum of the value obtained by the cloud buyers (e.g., cloud platform users 101) and cloud providers (e.g., cloud providers 102) as illustrated in the following equation:

$$\sum_{i \in N} v_i^{multi}(\Psi^*) \geq \sum_{i \in N} v_i(\Psi),\ \forall\, \Psi \subseteq \Omega \tag{3}$$

Additionally, the AMD approach is applied for trading networks to find a multi-cloud brokerage mechanism that fulfills the following: the mechanism (centralized broker) only earns money from participating i.e., the expected payments to the broker is non-negative, as illustrated in the following equation:

$$E_{P_{\mathcal{V}}}\left[\sum_{i \in N} \tau_i(v)\right] \geq 0 \tag{4}$$

Furthermore, the AMD approach is applied for trading networks to find a multi-cloud brokerage mechanism that fulfills the following: all parties can earn at least ∈ more than in the single-cloud setting as illustrated in the following equation:

$$\forall\, i \in \mathcal{N},\, v_i \in \mathcal{V},\, E_{(P_{\mathcal{V}}|v_i)}(v_i(\Psi) + \tau_i(v_i, v_{-i})) \geq \sigma_i^{v_i} + \epsilon \tag{5}$$

where $$\sigma_i^{vi}$$

is the utility of player i with type (valuation function) $v_i$ in the single-cloud setting and $P_v|v_i$ is the probability distribution $P_v$ conditioned on the value of player i being $v_i$.

In one embodiment, to find such a mechanism, the above set of constraints are formulated as the following optimization problem:

$$\min_h \sum_i P_{\mathcal{V}}[h_i(v_{-i})] \tag{6}$$

$$\text{s.t. } \sum_i P_{\mathcal{V}}[h_i(v_{-i})] \geq -(m-1)\sum_{i,j} P_{\mathcal{V}}\left[c_{i,j}^{v_i} q^{\star}(i, j \mid v)\right] \tag{7}$$

$$P_{\mathcal{V}}[h_i(v_{-i})] \leq \sigma_i^{v_i} + \epsilon - \sum_{i',j} P_{\mathcal{V}} \mid v_i\left[c_{i',j}^{(v_{i'})} q^{\star}(i', j \mid v)\right], \forall\, i, \forall\, v_i \tag{8}$$

In one embodiment, the utility of a party in a single-cloud setting is calculated as follows. It is assumed that the mechanism (centralized broker) has knowledge of a mechanism $M^{single}$, which given a set of value functions, determines the value of a party in a particular trading network with a specific set of values. In such a case, equation (5) above is changed to:

$$\forall\, i \in \mathcal{N},\, v_i \in \mathcal{V},\, \mathbb{E}_{v_i}[v_i(\Psi^*(v)) + p_i(v)] \geq \mathbb{E}_{|v_i}\left[u_i^{M^{single}}(v)\right] + \epsilon$$

in which case the constraint in equation (8) is changed to $$\mathbb{E}[h_i(v_{-i})] \leq \sum_{\substack{j \in \mathcal{N}_C \\ \forall i, \forall v_i}} \mathbb{E}_{|v_i}\left[v_j(\Psi^*(v)) - u_i^{M^{single}}(v)\right] + \epsilon, \tag{17}$$

In one embodiment, Equation 6 specifies that the average sum of payments the mechanism (centralized broker) will have to give to the parties is minimized. If it is at most zero, it means that a mechanism with the desired properties can be found for this specific distribution V. If it is negative, the absolute value of this objective is the average amount the centralized broker earns.

Equation 7 ensures that it is the optimal course of action for each player to truthfully reveal their costs and values to the centralized broker.

Equation 8 (resp. 17) ensures that on average, each participant gets at least $$\sigma_i^{vi} + \in,$$

where $$\sigma_i^{vi}$$

is the utility of player i with type $v_i$ in the single-cloud setting.

In one embodiment, following the AMD approach discussed above and the utilization of the optimization problem formulation, an appropriate mechanism can also be derived by using a learning approach rather than explicitly solving the above optimization problem. The benefits of such a learning approach are that (1) the distribution V does not have to be explicitly specified, as only samples are required, and (2) the optimization problem described above does not have to be explicitly solved.

Furthermore, it is noted that the trading network and AMD approach discussed above can be extended to cover service providers who are between the cloud buyers and cloud providers. A person of ordinary skill in the art would be capable of applying the principles of the present disclosure to such implementations by adding the value function for these additional parties, such that this value function contains any direct cost for providing the service which is not paid to the other parties in the multi-cloud environment. Furthermore, embodiments applying the principles of the present disclosure to such implementations would fall within the scope of the present disclosure.

As a result of the foregoing, the principles of the present disclosure address the motivations preventing the establishment of a multi-cloud environment. The principles of the present disclosure enable the establishment of a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation.

Furthermore, the principles of the present disclosure improve the technology or technical field involving a multi-cloud environment.

As discussed above, many organizations desire a multi-cloud approach to infrastructure because it addresses and helps eliminate some common challenges. For example, having more than one cloud platform allows organizations to take advantage of the unique features and capabilities of each cloud platform. For instance, one cloud platform might be optimized for application hosting while another cloud platform offers cost-effective, scalable space to store public archives, and so forth. With a multi-cloud approach, organizations overcome the limitations of vendor lock-in and can access all the different capabilities they need. Using a single-cloud approach, the cloud provider locks the cloud users to not only the features and capabilities of the cloud provider but also pricing and other factors, such as available services and tools. Another reason enterprises opt for multi-cloud is to comply with data sovereignty and regulations in specific geographic locations. Different regions and countries have different laws, so an organization might need to store customer data from one country, for example, on a cloud platform located there, while other customer data from another region is stored separately. Multi-cloud can also serve as an effective failover model which can help organizations retain data and keep operations running in the event of a cloud or connection failure. Having multiple copies and backups of critical data on different cloud platforms can mean faster recovery time and better business continuity if their main cloud platform goes down. Unfortunately, establishing a multi-cloud environment may result in direct economic losses to not only the cloud providers (provides on-demand, scalable computing resources, such as computing power, data storage, or applications over the Internet) but also to at least some of the cloud buyers (purchaser of computing resources provided by the cloud providers). For example, the cloud providers' prices in a multi-cloud environment may cause the cloud buyers to lose money as compared to the prices paid in the single-cloud environment (cloud buyer relies upon one cloud provider to provide computing resources). As a result, currently, a multi-cloud environment does not necessarily benefit the relevant parties (e.g., cloud providers, cloud buyers), including cloud buyers, thereby lessening the incentive to establish a multi-cloud environment. Furthermore, for existing methods to establish a multi-cloud environment that benefits the relevant parties, information, including confidential information, such as information technology costs and the value of the information technology for the cloud buyers and cloud providers, needs to be obtained. Unfortunately, there is little incentive for the parties to disclose such confidential information. Consequently, there are motivations preventing the establishment of a multi-cloud environment.

Embodiments of the present disclosure improve such technology by modeling a multi-cloud environment using a game theoretic model. A game theoretic model, as used herein, refers to models that use game theory to predict the actions of either cooperative or competitive individuals (or firms). An example of such a game theoretic model corresponds to trading networks. A trading network, as used herein, refers to a business-to-business network linking buyers, sellers, suppliers, strategic partners, etc. in a marketplace. Furthermore, a probability distribution over information technology costs for both the cloud buyers and cloud providers is created. In one embodiment, the probability distribution over information technology costs for both the cloud buyers and cloud provider is created using information about the single-cloud environment. Additionally, an estimate of the expected utility (measure of how much benefit a party receives or is expected to receive) for each party in a single-cloud environment is calculated. In one embodiment, the estimate of the expected utility for each party in the single-cloud environment is calculated using information about the single-cloud environment, such as current prices, costs, cost discounts, negotiation practices, contracts, etc. Furthermore, a mechanism (centralized broker) for the multi-cloud environment is created that collects payments from the cloud buyers and makes payments to the cloud providers based on the game theoretic model receiving inputs of the expected utility for each party in the single-cloud environment and the probability distribution over information technology costs for both the cloud buyers and the cloud providers. In one embodiment, such a mechanism is configured to establish a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation. In one embodiment, such a mechanism is created by applying an automated mechanism design approach to the game theoretic model while satisfying the following requirements: ensuring optimal behavior for the parties to reveal their true costs (truthful participation), maximizing the sum of the utilities for the parties, ensuring that the parties obtain on average a higher utility in the multi-cloud environment than in the single-cloud environment, and ensuring that the mechanism does not lose money on average from participating in the multi-cloud environment. In this manner, the motivations preventing the establishment of a multi-cloud environment are addressed by establishing a multi-cloud environment that is beneficial to the relevant parties (e.g., cloud providers, cloud buyers) by inherently including the incentives for the relevant parties to divulge their confidential information, such as by establishing that the optimal strategy for the relevant parties is truthful participation. Furthermore, in this manner, there is an improvement in the technical field involving a multi-cloud environment.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for establishing a multi-cloud environment, the method comprising;

modeling the multi-cloud environment using a game theoretic model by defining the multi-cloud environment to consist of cloud buyers, such that each cloud buyer has a machine learning workflow to run, wherein the machine learning workflow is composed of a data extraction task and a machine learning task, wherein the game theoretic model is a trading network corresponding to a business-to-business network linking the cloud buyers and cloud providers in a marketplace;

creating a probability distribution over information technology costs for the cloud buyers and the cloud providers, wherein the cloud buyers are purchasers of computing resources, wherein the cloud providers provide on-demand, scalable computing resources;

calculating an estimate of an expected utility for each party in a single-cloud environment;

creating a centralized broker for the multi-cloud environment that collects payments from the cloud buyers and makes payments to the cloud providers using the estimated expected utility for each party in the single-cloud environment and the probability distribution over information technology costs for the cloud buyers and the cloud providers as parameters to the game theoretic model;

establishing the multi-cloud environment by the centralized broker by identifying a set of bi-lateral trades that constitutes an equilibrium in the trading network, wherein the centralized broker utilizes the probability distribution over information technology costs and the estimate of the expected utility for each party in the single-cloud environment to determine a valuation function for each cloud buyer and cloud provider, and wherein the centralized broker routes payments for the set of bi-lateral trades based on a real value mapped by the valuation function; and automatically routing data traffic for the machine learning workflow between at least two different public cloud platforms via a network gateway according to the set of bi-lateral trades identified by the centralized broker to maximize utility for the cloud buyers and the cloud providers.

2. The method as recited in claim 1 further comprising:

calculating the estimate of the expected utility for each party in the single-cloud environment and creating the probability distribution over information technology costs for cloud users and the cloud providers using information about the single-cloud environment, wherein the information comprises current prices, costs, cost discounts, negotiation practices, and contracts.

3. The method as recited in claim 1 further comprising:

creating the centralized broker for the multi-cloud environment that collects payments from the cloud buyers and makes payments to the cloud providers using an automated mechanism design.

4. The method as recited in claim 3, wherein the automated mechanism design is applied to the game theoretic model.

5. The method as recited in claim 3, wherein the automated mechanism design solves an optimization problem to create the mechanism for the multi-cloud environment that collects payments from the cloud buyers and makes payments to the cloud providers.

6. The method as recited in claim 1, wherein the centralized broker fulfills the following requirements: maximizing a sum of utilities for parties to the multi-cloud environment, revealing true costs is an optimal strategy for parties to the multi-cloud environment, ensuring parties to the multi-cloud environment obtain on average a higher utility in the multi-cloud environment than in the single-cloud environment, and ensuring the mechanism does not lose money on average from participating in the multi-cloud environment.

7. The method as recited in claim 1, wherein the probability distribution over information technology costs for the cloud buyers and the cloud provider is created using information about the single-cloud environment, wherein the information comprises current prices, costs, cost discounts, negotiation practices, and contracts.

8. A computer program product for establishing a multi-cloud environment, the computer program product comprising one or more computer readable storage mediums having program code embodied therewith, the program code comprising programming instructions for:

modeling the multi-cloud environment using a game theoretic model by defining the multi-cloud environment to consist of cloud buyers, such that each cloud buyer has a machine learning workflow to run, wherein the machine learning workflow is composed of a data extraction task and a machine learning task, wherein the game theoretic model is a trading network corresponding to a business-to-business network linking the cloud buyers and cloud providers in a marketplace;

creating a probability distribution over information technology costs for the cloud buyers and the cloud providers, wherein the cloud buyers are purchasers of computing resources, wherein the cloud providers provide on-demand, scalable computing resources;

calculating an estimate of an expected utility for each party in a single-cloud environment;

creating a centralized broker for the multi-cloud environment that collects payments from the cloud buyers and makes payments to the cloud providers using the estimated expected utility for each party in the single-cloud environment and the probability distribution over information technology costs for the cloud buyers and the cloud providers as parameters to the game theoretic model;

establishing the multi-cloud environment by the centralized broker by identifying a set of bi-lateral trades that constitutes an equilibrium in the trading network, wherein the centralized broker utilizes the probability distribution over information technology costs and the estimate of the expected utility for each party in the single-cloud environment to determine a valuation function for each cloud buyer and cloud provider, and wherein the centralized broker routes payments for the set of bi-lateral trades based on a real value mapped by the valuation function; and automatically routing data traffic for the machine learning workflow between at least two different public cloud platforms via a network gateway according to the set of bi-lateral trades identified by the centralized broker to maximize utility for the cloud buyers and the cloud providers.

9. The computer program product as recited in claim 8, wherein the program code further comprises the programming instructions for:

calculating the estimate of the expected utility for each party in the single-cloud environment and creating the probability distribution over information technology costs for cloud users and the cloud providers using information about the single-cloud environment, wherein the information comprises current prices, costs, cost discounts, negotiation practices, and contracts.

10. The computer program product as recited in claim 8, wherein the program code further comprises the programming instructions for:

creating the centralized broker for the multi-cloud environment that collects payments from the cloud buyers and makes payments to the cloud providers using an automated mechanism design.

11. The computer program product as recited in claim 10, wherein the automated mechanism design is applied to the game theoretic model.

12. The computer program product as recited in claim 10, wherein the automated mechanism design solves an optimization problem to create the mechanism for the multi-cloud environment that collects payments from the cloud buyers and makes payments to the cloud providers.

13. The computer program product as recited in claim 8, wherein the centralized broker fulfills the following requirements: maximizing a sum of utilities for parties to the multi-cloud environment, revealing true costs is an optimal strategy for parties to the multi-cloud environment, ensuring parties to the multi-cloud environment obtain on average a higher utility in the multi-cloud environment than in the single-cloud environment, and ensuring the mechanism does not lose money on average from participating in the multi-cloud environment.

14. The computer program product as recited in claim 8, wherein the probability distribution over information technology costs for the cloud buyers and the cloud provider is created using information about the single-cloud environment, wherein the information comprises current prices, costs, cost discounts, negotiation practices, and contracts.

15. A system, comprising:

a memory for storing a computer program for establishing a multi-cloud environment; and a processor connected to the memory, wherein the processor is configured to execute program instructions of the computer program comprising:

modeling the multi-cloud environment using a game theoretic model by defining the multi-cloud environment to consist of cloud buyers, such that each cloud buyer has a machine learning workflow to run, wherein the machine learning workflow is composed of a data extraction task and a machine learning task, wherein the game theoretic model is a trading network corresponding to a business-to-business network linking the cloud buyers and cloud providers in a marketplace;

creating a probability distribution over information technology costs for the cloud buyers and the cloud providers, wherein the cloud buyers are purchasers of computing resources, wherein the cloud providers provide on-demand, scalable computing resources;

calculating an estimate of an expected utility for each party in a single-cloud environment;

creating a centralized broker for the multi-cloud environment that collects payments from the cloud buyers and makes payments to the cloud providers using the estimated expected utility for each party in the single-cloud environment and the probability distribution over information technology costs for the cloud buyers and the cloud providers as parameters to the game theoretic model;

establishing the multi-cloud environment by the centralized broker by identifying a set of bi-lateral trades that constitutes an equilibrium in the trading network, wherein the centralized broker utilizes the probability distribution over information technology costs and the estimate of the expected utility for each party in the single-cloud environment to determine a valuation function for each cloud buyer and cloud provider, and wherein the centralized broker routes payments for the set of bi-lateral trades based on a real value mapped by the valuation function; and automatically routing data traffic for the machine learning workflow between at least two different public cloud platforms via a network gateway according to the set of bi-lateral trades identified by the centralized broker to maximize utility for the cloud buyers and the cloud providers.

16. The system as recited in claim 15, wherein the program instructions of the computer program further comprise:

calculating the estimate of the expected utility for each party in the single-cloud environment and creating the probability distribution over information technology costs for cloud users and the cloud providers using information about the single-cloud environment, wherein the information comprises current prices, costs, cost discounts, negotiation practices, and contracts.

17. The system as recited in claim 15, wherein the program instructions of the computer program further comprise:

creating the centralized broker for the multi-cloud environment that collects payments from the cloud buyers and makes payments to the cloud providers using an automated mechanism design.

18. The system as recited in claim 17, wherein the automated mechanism design is applied to the game theoretic model.

19. The system as recited in claim 17, wherein the automated mechanism design solves an optimization problem to create the mechanism for the multi-cloud environment that collects payments from the cloud buyers and makes payments to the cloud providers.

20. The system as recited in claim 15, wherein the centralized broker fulfills the following requirements: maximizing a sum of utilities for parties to the multi-cloud environment, revealing true costs is an optimal strategy for parties to the multi-cloud environment, ensuring parties to the multi-cloud environment obtain on average a higher utility in the multi-cloud environment than in the single-cloud environment, and ensuring the mechanism does not lose money on average from participating in the multi-cloud environment.

* * * * *